(12) United States Patent
Kuribayashi

(10) Patent No.: US 10,647,176 B2
(45) Date of Patent: May 12, 2020

(54) ACTUATOR CONTROL SYSTEM

(71) Applicant: DENSO CORPORATION, Kariya, Aichi-pref. (JP)

(72) Inventor: Nobukazu Kuribayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 183 days.

(21) Appl. No.: 15/556,508

(22) PCT Filed: Mar. 4, 2016

(86) PCT No.: PCT/JP2016/001202
§ 371 (c)(1),
(2) Date: Sep. 7, 2017

(87) PCT Pub. No.: WO2016/147590
PCT Pub. Date: Sep. 22, 2016

(65) Prior Publication Data
US 2018/0043748 A1    Feb. 15, 2018

(30) Foreign Application Priority Data
Mar. 13, 2015 (JP) .................................. 2015-051069

(51) Int. Cl.
*B60H 1/00* (2006.01)
*H02P 8/00* (2006.01)
*H02P 8/14* (2006.01)

(52) U.S. Cl.
CPC .......... *B60H 1/00857* (2013.01); *H02P 8/00* (2013.01); *H02P 8/14* (2013.01)

(58) Field of Classification Search
CPC .......... B60H 1/00; F24F 13/10; G03G 15/00; G03G 21/00; H02P 6/06; H02P 8/00; H02P 8/14
See application file for complete search history.

(56) References Cited

U.S. PATENT DOCUMENTS 5,582,234 A * 12/1996 Samukawa ........ B60H 1/00735
165/204
5,755,378 A * 5/1998 Dage .................. B60H 1/00735
165/204

(Continued)

FOREIGN PATENT DOCUMENTS

JP    H06074548 A    3/1994
JP    2000168341 A    6/2000

(Continued)

*Primary Examiner* — Bickey Dhakal
*Assistant Examiner* — Said Bouziane
(74) *Attorney, Agent, or Firm* — Harness, Dickey & Pierce, P.L.C.

(57) ABSTRACT

An air conditioner ECU transmits a communication message in a format for controlling a stepper motor. Since a stepper motor and a DC motor are controlled by a communication message in respective predetermined formats, the DC motor cannot be controlled with the communication message transmitted by the air conditioner ECU. Therefore, the sub ECU relays the communication message transmitted by the air conditioner ECU and drives the actuator. The sub ECU converts the communication message transmitted by the air conditioner ECU into control information corresponding to a predetermined format of each actuator and drives each actuator based on the converted control information.

10 Claims, 4 Drawing Sheets

(56) References Cited

U.S. PATENT DOCUMENTS

| | | | |
|---|---|---|---|
| 6,296,562 B1 | 10/2001 | Uemura et al. | |
| 6,659,358 B2 * | 12/2003 | Kamiya | B60H 1/00792 |
| | | | 165/204 |
| 8,378,616 B2 * | 2/2013 | Sun | H02P 5/68 |
| | | | 318/116 |
| 2002/0036081 A1 * | 3/2002 | Ito | B60H 1/00828 |
| | | | 165/202 |
| 2004/0026522 A1 | 2/2004 | Keen et al. | |
| 2004/0124797 A1 * | 7/2004 | Takeuchi | H02K 11/00 |
| | | | 318/466 |
| 2012/0277916 A1 | 11/2012 | Delorme et al. | |
| 2014/0265993 A1 * | 9/2014 | Watahiki | H02P 8/00 |
| | | | 318/696 |

FOREIGN PATENT DOCUMENTS

| | | |
|---|---|---|
| JP | 2000238526 A | 9/2000 |
| JP | 2003523873 A | 8/2003 |
| JP | 2011114951 A | 6/2011 |

\* cited by examiner

ACTUATOR CONTROL SYSTEM

CROSS REFERENCE TO RELATED APPLICATIONS

This application is a U.S. National Phase Application under 35 U.S.C. 371 of International Application No. PCT/JP2016/001202 filed on Mar. 4, 2016 and published in Japanese as WO 2016/147590 A1 on Sep. 22, 2016. This application is based on and claims the benefit of priority from Japanese Patent Application No. 2015-051069 filed on Mar. 13, 2015. The entire disclosures of all of the above applications are incorporated herein by reference.

TECHNICAL FIELD

The present disclosure relates to an actuator control system that controls an actuator of a vehicle air conditioning apparatus that blows a conditioned air into a vehicle interior.

BACKGROUND ART

A conventional vehicle air conditioning apparatus includes a blower that blows an air into an air flow passage and a door that adjusts the amount of air passing through the air flow passage. The blower is driven by a blower motor. The door is driven by a servomotor. Therefore, electrical components such as the servomotor and the blower motor are mounted on the vehicle air conditioning apparatus. Driving of those electrical components is controlled by an A/C ECU (air conditioner control device).

Two types of a DC servomotor with a potentiometer and a stepper motor are mainly used as the actuator. Along with the widespread use of the vehicle air conditioning apparatuses, it is general to standardize the electrical components and use the same kind of motors without mixing the DC servomotors with potentiometers with the stepper motors to reduce the costs. With an increase in the number of actuators attributable to the enhancement of functions, the number of wires and the weight are increased, and an assembling property is deteriorated. Therefore, in order to improve the ease of assembly and the like, systems in which a communication network of the vehicle is locally networked (communication) are also increasing.

However, with the reduction in the costs of the electronic components, in particular, the reduction in the costs of a microcomputer, an integrated system that drives multiple actuators may be inexpensive. In an integrated module of Patent Literature 1, most of the control circuits incorporated in the respective electrical components of the vehicle user interface unit, the air conditioning control unit, and the vehicle air conditioning apparatus are incorporated into the integrated module, and electric wires necessary for the integrated module are reduced from the air conditioning control unit. Even such an integrated module communicates with a host control device, and a standard actuator is driven by standard communication messages.

The performances required for respective doors for controlling a wind direction of the vehicle air conditioning apparatus are different from each other. For example, for a temperature control, an actuator with a high resolution stop precision is required in order to perform fine control. In addition, inside/outside air doors and blowing mode switching doors are required to have a high responsiveness (speed) for performing odor interruption and defogging. In general, a DC motor (direct-current motor) used for the vehicle air conditioning apparatus has a high torque and a high speed, but a resolution of the sensor is low. Also, the stepper motor is high in resolution, but low in torque.

In the integrated module disclosed in Patent Literature 1 described above, a door drive motor is controlled by the standard communication messages. Since the communication messages used for control are different between the DC motor and the stepper motor, only the same kind of drive motors can be used in the integrated module. Therefore, when one of the DC motor and the stepper motor is used as a standard product, there is a possibility that the functions required for the vehicle air conditioning apparatus and the doors are limited, such as sacrificing accuracy or sacrificing high responsiveness.

PRIOR ART LITERATURE

Patent Literature

Patent Literature 1: JP 2003-523873 A

SUMMARY

Therefore, the present disclosure has been made in view of the above points, and an object of the present invention is to provide an actuator control system capable of driving actuators for different types of doors with one communication message in a communicated system.

According to an aspect of the present disclosure, an actuator control system is used for a vehicle air conditioning apparatus that blows conditioned air into a vehicle interior. The actuator control system includes a plurality of doors that adjust an amount of air passing through an air flow passage which is for blowing the air into the vehicle interior, a plurality of actuators that drive the respective doors, a main control unit that transmits a communication message for controlling driving of the respective actuators, and a sub-control unit that relays the communication message transmitted by the main control unit and drives the respective actuators. The main control unit transmits the communication message in a single format to the plurality of actuators. The sub-control unit converts the communication message transmitted by the main control unit into control information corresponding to a predetermined format of each of the actuators, and drives each of the actuators.

According to the above configuration, the main control unit transmits the communication message in the single format to the multiple actuators. Since each of the multiple actuators is controlled by the communication message of the predetermined format, there are also actuators controlled in the format different from that of the communication message transmitted by the main control unit. Such actuators cannot be controlled by the communication message transmitted by the main control unit. However, in the present disclosure, there is the sub-control unit that relays the communication message transmitted from the main control unit and drives the actuators.

The sub-control unit converts the communication message transmitted by the main control unit into control information corresponding to the predetermined format of each actuator to drive each actuator. As a result, even each of the actuators that are controlled in a format different from that of the communication message transmitted from the main control unit can be driven by the sub-control unit.

As a result, the multiple actuators can be controlled without changing the configuration of the main control unit according to the actuators. In each of the actuators, the resolution of the response speed and the control position is different depending on the structure and the like, and when the structure is different, the format of the communication message may be different. Even with such actuators having different structures, the main control unit can comprehensively control the multiple actuators by relaying the sub-control unit. Therefore, the door suitable for the performance of each of the actuators is driven, thereby being capable of controlling the amount of air passing through the air flow passage of the vehicle air conditioning apparatus so as to be more suitable for air conditioning in the vehicle interior.

DESCRIPTION OF EMBODIMENTS

Figure 1:
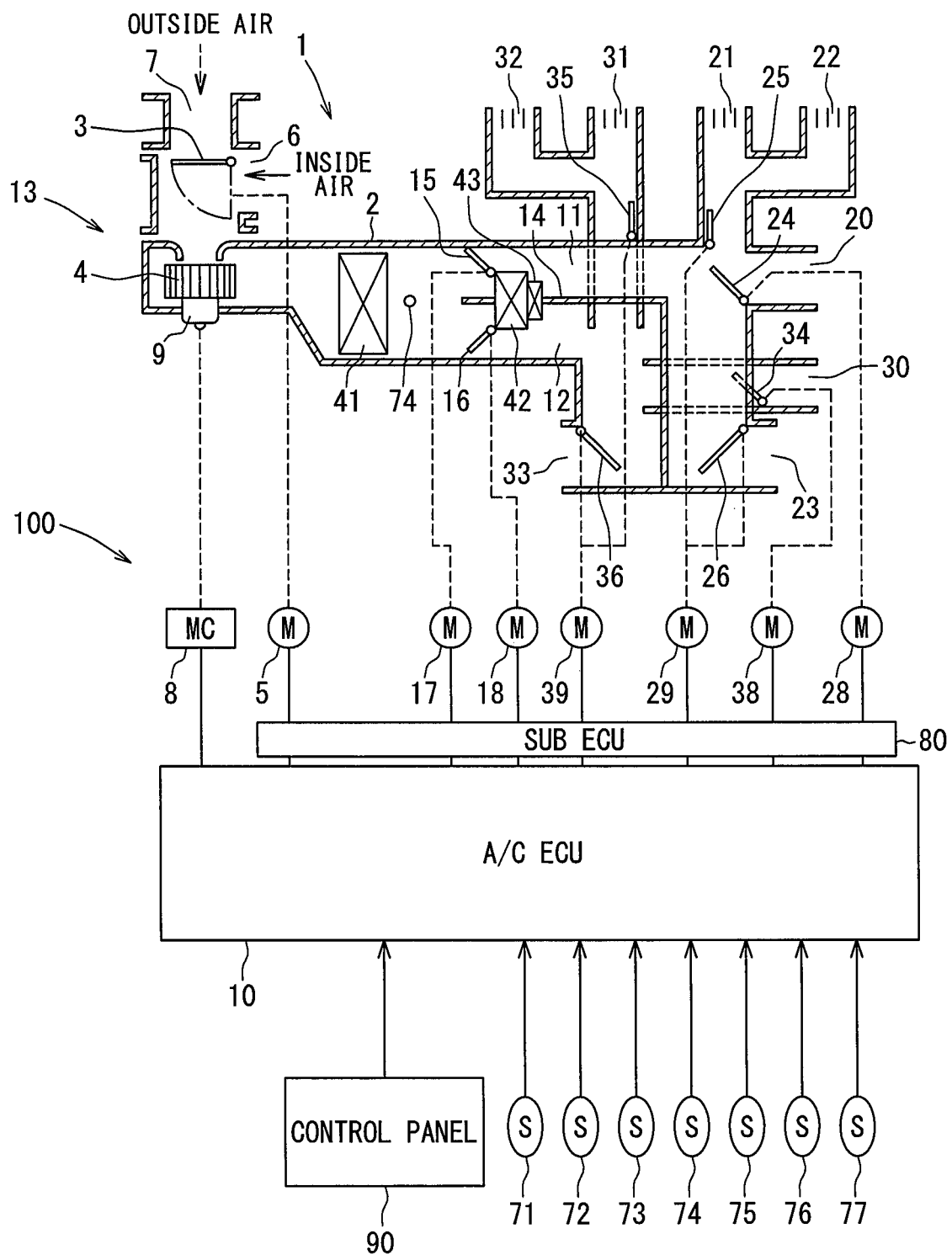
FIG. 1 is a diagram illustrating a vehicle air conditioning apparatus according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 5. A vehicle air conditioning apparatus 100 is a so-called auto air conditioner system configured to control an air conditioning unit 1 for conditioning an air in a vehicle interior by an air conditioner ECU 10 in a vehicle such as an automobile equipped with a water-cooled engine for traveling.

The air conditioning unit 1 is an air conditioner unit capable of performing a temperature control between a driver's seat side air conditioning space and a passenger's seat side air conditioning space in the vehicle interior, a change in a blowing port mode, and the like, independently of each other. The driver's seat side air conditioning space is a space including the driver's seat and a rear seat behind the driver's seat. The passenger's seat side air conditioning space is a space including the passenger's seat and a rear seat behind the passenger's seat.

The air conditioning unit 1 is disposed in front of the vehicle interior of the vehicle and includes an air conditioning case 2 through which the blown air passes. In the air conditioning case 2, an air intake port is provided on one side, and multiple blowing ports through which the air going into the vehicle interior passes are formed on the other side. The air conditioning case 2 has an air flow passage through which the blown air passes between the air intake port and the blowing ports. A blower unit 13 is provided on the air intake port side of the air conditioning case 2. The blower unit 13 includes an inside/outside air switching door 3 and a blower 4. The inside/outside air switching door 3 is an intake port switching device that is driven by an actuator such as a switching servomotor 5, and changes opening degrees of an inside air suction port 6 and an outside air suction port 7, which are air intake ports.

Although not specifically shown, the air conditioning unit 1 is of a type called a complete center placement and is mounted at a lower part of an instrument panel in front of the vehicle interior and at the center position in a lateral direction of the vehicle. The blower unit 13 is disposed on a vehicle front side of the air conditioning unit 1. The inside air suction port 6 of the blower unit 13 opens to a lower side of the driver's seat side and draws the vehicle interior air from the driver's seat side.

The blower 4 is a centrifugal blower that is rotationally driven by a blower motor 9 controlled by a blower drive circuit 8 to generate an air flow toward the vehicle interior in the air conditioning case 2. The blower 4 also has a function of changing a blown air volume of the conditioned air blown out from the respective blowing ports 20 to 23 and 30 to 33 on the driver's seat side and the passenger's seat side, which will be described later, toward the driver's seat side air conditioning space and the passenger's seat side air conditioning space in the vehicle interior.

The air conditioning case 2 is provided with an evaporator 41, a heater core 42, and a PTC heater 43 as air conditioning units for heating or cooling the air blown from the blower unit 13 as the conditioned air and feeding the conditioned air to the multiple blowing ports. Specifically, the air conditioning case 2 is provided with the evaporator 41 as a cooler for cooling the air passing through the air conditioning case 2.

The heater core 42 is disposed on an air downstream side of the evaporator 41. The heat core 42 exchanges heat between the air passing through a first air passage 11 and a second air passage 12 and a coolant for an engine to heat the air. The heater core 42 is provided in a coolant circuit (not illustrated) through which the coolant for the engine circulates. In addition to the heater core 42, the coolant circuit includes an electric water pump, a radiator, a thermostat and the like. The coolant circuit is configured to circulate the coolant warmed by a water jacket of the engine by the aid of an electric water pump. The coolant that has cooled the engine flows inside the heater core 42, and the heater core 42 reheats a cold air with the coolant as a heating heat source. The heater core 42 is disposed so as to partially close the first air passage 11 and the second air passage 12.

The PTC (positive temperature coefficient) heater 43 is disposed on the air downstream side of the heater core 42. The PTC heater 43 corresponds to an auxiliary heating device that heats the air with the use of a heat source other than a waste heat of the travel engine 60 for heating, and uses an electric power as a heat source. The PTC heater 43 heats the air that has passed through the heater core 42 as a heating heat source. The PTC heater 43 includes an energization heat generating element unit (not illustrated), and generates heat by energizing the energization heat generating element unit, thereby being capable of warming a surrounding air. The PTC heater 43 includes multiple energization heat generating element units, and generates heat by energization of an arbitrary number of energization heat generating element units by a switch or a relay to warm the surrounding air. Switching of the switch or relay is controlled by the air conditioner ECU 10. The energization heat generating element units are each formed by fitting multiple PTC elements into a resin frame molded with a heat resistant resin material, for example, 66 nylon, polybutadiene terephthalate or the like.

The first air passage 11 and the second air passage 12 are partitioned by a partition plate 14. In addition, for example, in the vehicle air conditioning apparatus 100 used for a vehicle traveling with an electric power, a Peltier element may be used in place of the evaporator 41 or the heater core 42. A driver's seat side air mixing door 15 and a passenger's seat side air mixing door 16 are disposed on the air upstream side of the heater core 42. The driver's seat side air mixing door 15 and the passenger's seat side air mixing door 16 are configured to control the temperatures of the driver's seat side air conditioning space and the passenger's seat side air conditioning space in the vehicle interior, independently of each other.

The respective air mixing doors 15 and 16 are driven by actuators such as stepper motors 17 and 18, respectively, and change blowing temperatures of the conditioned air blown from the respective blowing ports 20 to 23 and 30 to 33 on the driver's seat side and the passenger's seat side toward the respective air conditioning spaces in the vehicle interior. In other words, the air mixing doors 15 and 16 function as an air mixing device that adjusts an air volume ratio between the air passing through the evaporator 41 and the air passing through the heater core 42.

The evaporator 41 forms one component of a refrigeration cycle (not illustrated). The refrigeration cycle includes a compressor, a receiver, an expansion valve, and an evaporator 41. The compressor is driven by a belt drive derived from an output shaft of a vehicle traveling engine mounted in an engine compartment of the vehicle or an electric motor to compress and discharge the refrigerant. A condenser condenses and liquefies the refrigerant discharged from the compressor. The receiver separates the liquid refrigerant flowing in from the condenser into gas and liquid. The expansion valve adiabatically expands the liquid refrigerant flowing in from the receiver. The evaporator 41 evaporates and vaporizes a gas-liquid two-phase refrigerant flowing in from the expansion valve.

As illustrated in FIG. 1, the driver's seat side defroster blowing port 20, the driver's seat side center face blowing port 21, the driver's seat side face blowing port 22, and the driver's seat side foot blowing port 23 communicate with each other through respective air blowing ducts on an air downstream side of the first air passage 11. As illustrated in FIG. 1, the passenger's seat side defroster blowing port 30, the passenger's seat side center face blowing port 31, the passenger's seat-side side face blowing port 32, and the passenger's seat side foot blowing port 33 communicate with each other through respective air blowing ducts on an air downstream side of the second air passage 12.

The driver's seat side defroster blowing port 20 and the passenger's seat side defroster blowing port 30 form blowing ports for blowing the conditioned air toward a front window glass of the vehicle. The driver's seat side face blowing port 21 and the driver's seat-side side face blowing port 22 form blowing ports for blowing the conditioned air to the head and chest of the driver. The passenger's seat side face blowing port 31 and the passenger's seat-side side face blowing port 32 form blowing ports for blowing the conditioned air to the heads and chests of the driver and a passenger's seat occupant. The driver's seat side foot blowing port 23 and the passenger's seat side foot blowing port 33 form blowing ports for blowing the conditioned air to the feet of the driver and the passenger's seat occupant.

Although not shown in FIG. 1, a rear seat side center face blowing port, a rear seat-side side face blowing port, and a rear seat side foot blowing port are disposed on the downstream side of the first air passage 11 and the second air passage 12 as the blowing ports for the rear seats, respectively.

A driver's seat side blowing port switching door and a passenger's seat side blowing port switching door are disposed in the first air passage 11 and the second air passage 12. The driver's seat side blowing port switching door and the passenger's seat side blowing port switching door set air blowing modes on the driver's seat side and the passenger's seat side in the vehicle interior, independently of each other. A driver's seat side defroster door 24 and a passenger's seat side defroster door 34, a driver's seat side face door 25 and a passenger's seat side face door 35, and a driver's seat side foot door 26 and a passenger's seat side foot door 36 are disposed as the driver's seat side blowing port switching doors and the passenger's seat side blowing port switching doors, respectively.

The driver's seat side blowing port switching doors 24 to 26 and the passenger's seat side blowing port switching doors 34 to 36 are driven by actuators such as DC motors 28, 29, 38, and 39, to switch the air blowing modes on the driver's seat side and the passenger's seat side, respectively. In FIG. 1, the driver's seat side face door 25 and the driver's seat side foot door 26 are driven by one driver's seat side face door motor 29, but individual actuators may be used. Similarly, the passenger's seat side face door 35 and the passenger's seat side foot door 36 are driven by one passenger's seat side face door motor 39, but individual actuators may be used.

The driver's seat side defroster door 24 is driven by the driver's seat side defroster door motor 28. The driver's seat side defroster door motor 28 is a DC motor. The passenger's seat side defroster door 34 is driven by the passenger's seat side defroster door motor 38. The passenger's seat side defroster door motor 38 is a DC motor.

The driver's seat side blowing port switching doors 24 to 26 are opening and closing devices for switching between a permitted state permitting the passage of conditioned air blown from the blowing ports 20 to 23 with the driver's seat as an air conditioning area among the multiple blowing ports 20 to 23 and 30 to 33, and a blocked state in which the passage is blocked. In addition, the passenger's seat side blowing port switching doors 34 to 36 are opening and closing devices for switching between a permitted state permitting the passage of the conditioned air blown from the blowing ports 30 to 33 with the passenger's seat as the air conditioning area among the multiple blowing ports 20 to 23 and 30 to 33, and a blocked state in which the passage is blocked. For example, a face mode, a bi-level (B/L) mode, a foot mode, a foot/defroster mode, and a defroster mode are available as the blowing port modes on the driver's seat side and the passenger's seat side.

Likewise for the rear seat, a rear seat side defroster door, a rear seat side face door, and a rear seat side foot door are provided as the rear seat blowing port switching doors for setting the rear seat air blowing mode. The driver's seat side blowing port switching door is driven by an actuator such as a DC motor and switches the air blowing mode on the rear seat side.

The rear seat side blowing port switching doors are opening and closing devices for switching between a permitted state permitting the passage of conditioned air blown from the air outlets with the rear seat as an air conditioning area among the multiple air outlets, and a blocked state in which the passage is blocked. For example, a face mode, a bi-level (B/L) mode, and a foot mode are available as the blowing port modes on the rear seat side.

Next, the control of the vehicle air conditioning apparatus 100 will be described. The air conditioner ECU 10 is a main control unit. When an ignition switch that controls starting and stopping of the engine is turned on, the air conditioner ECU 10 receives a DC power from a battery (not illustrated), which is an in-vehicle power supply mounted on the vehicle, and starts an arithmetic process and a control process. The air conditioner ECU 10 is configured to receive the respective switch signals from various operation switches on the air conditioner control panel 90.

Although not shown, for example, a liquid crystal display, an inside/outside air switching switch, a front defroster switch, a rear defroster switch, a dual switch, an air blowing mode switching switch, a blower air volume switching switch, an air-conditioning switch, an auto-switch, an off-switch, a temperature setting switch, a driver's seat air conditioning switch, and the like are installed in the air conditioner control panel 90.

The liquid crystal display is equipped with, for example, a set temperature display unit for visually displaying a set temperature of the air conditioning spaces on the driver's seat side and the passenger's seat side, an air blowing mode display unit for visually displaying the air blowing mode, an air volume display unit for visually displaying the blower air volume, and so on. The liquid crystal display may be provided with, for example, an outside air temperature display unit, a suction mode display unit, a time display unit, and the like. Various operation switches on the air conditioner control panel 90 may be provided on the liquid crystal display.

The air conditioner control panel 90 will be described with respect to various switches. The front defroster switch corresponds to an air conditioning switch for commanding whether to enhance a defogging performance of the front window glass, or not. The dual switch is a left and right independent control command device that commands an independent left and right temperature control for performing the temperature adjustment in the driver's seat side air conditioning space and the temperature adjustment in the passenger's seat side air conditioning space, independently of each other. The mode switching switch is a mode request device that requests the air blowing mode to be set to one of the face mode, the bi-level (B/L) mode, the foot mode, and the foot/defroster mode according to a manual operation by an occupant. The air-conditioning switch is an air conditioning operation switch for commanding the operation or stop of the compressor of the refrigeration cycle. The temperature setting switch is a driver's seat side and passenger's seat side temperature setting device for setting (Tset) the respective temperatures in the driver's seat side air conditioning space and the passenger's seat side air conditioning space to a desired temperature. The driver's seat air conditioning switch is an input device for requesting the air conditioning mode to be set to a driver's seat mode which will be described later according to the manual operation of the occupant.

Although not shown in the drawing, the air conditioner ECU 10 is internally equipped with a known microcomputer including functions of a CPU (central processing unit) that performs an arithmetic process and a control process, a memory such as a ROM and a RAM, an I/O port (input/output circuit), and so on. After sensor signals from various sensors have been subjected to A/D conversion by the I/O port or an A/D conversion circuit, the sensor signals are input to the microcomputer. The various sensors are connected to the air conditioner ECU 10.

The inside air temperature sensor 71 functions as an inside air temperature detection device that detects an air temperature (inside air temperature) Tr around the driver's seat. The outside air temperature sensor 72 functions as an outside air temperature detection device that detects a vehicle exterior temperature (outside air temperature). The insolation sensor 73 functions as an insolation detection device that detects the amount of insolation. The post-evaporation temperature sensor 74 functions as a post-evaporation temperature detection device that detects the air temperature (post evaporation temperature TE) immediately after having passed through the evaporator 41. The coolant temperature sensor 75 functions as a heating temperature detection device that detects the engine coolant temperature of the vehicle and sets the detected temperature as a heating temperature of the blown air. The humidity sensor 76 functions as a humidity detection device that detects a relative humidity in the vehicle interior. The seating sensor 77 functions as an occupant detection device that detects whether an occupant is present in each seat, or not.

Figure 2:
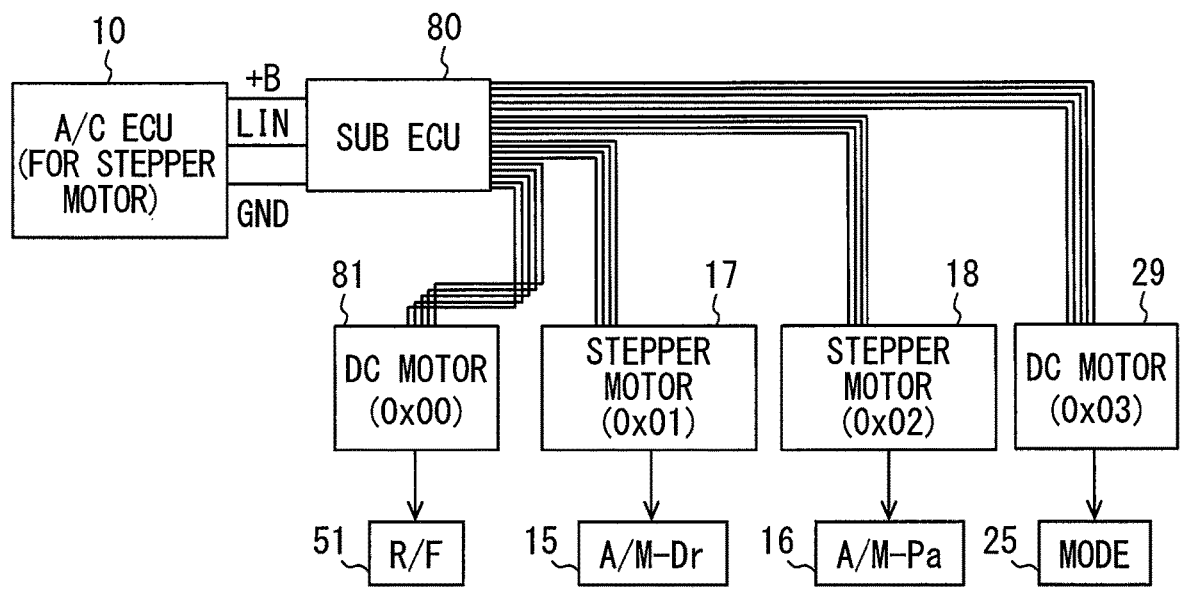
FIG. 2 is a block diagram illustrating an actuator control system according to the first embodiment.

Next, the control of the actuator by the air conditioner ECU 10 will be described with reference to FIGS. 2 to 5. As illustrated in FIG. 2, in the actuator control system according to the present embodiment, a sub ECU 80 is disposed between the air conditioner ECU 10 and the respective actuators. The sub ECU 80 is mounted in the vehicle air conditioning apparatus 100. In addition, the air conditioner ECU 10 communicates with the respective devices including the sub ECU 80 by the aid of a LAN bus.

The sub ECU 80 is connected to the respective actuators not through the LAN bus but through a connection cables, individually. Although not shown in the drawing, the sub ECU 80 is internally equipped with a known microcomputer including functions of a CPU (central processing unit) that performs an arithmetic process and a control process, a memory such as a ROM and a RAM, an I/O port (input/output circuit), and so on.

Next, the actuators connected to the sub ECU 80 will be described. In FIG. 2, for facilitation of understanding, a part of the actuator of the air conditioning unit 1 is illustrated. The four actuators illustrated in FIG. 2 are the driver's seat side stepper motor 17, the passenger's seat side stepper motor 18, the driver's seat side face door motor 29, and the rear seat side face door motor 81. In FIG. 2, the driver's seat side air mixing door 15 is indicated as A/M-Dr, and the passenger's seat side air mixing door 16 is indicated as NM-Pa. Also, the driver's seat side face door 25 is indicated as MODE, and the rear seat face door 51 is denoted as R/F.

The driver's seat side face door motor 29 and the rear seat side face door motor 81 are DC motors with a potentiometer. Therefore, the driver's seat side face door motor 29 and the rear seat side face door motor 81 each have a position detection mechanism that detects the rotational position by itself.

An LIN (local interconnect network) is used as a serial communication protocol for an in-vehicle LAN. When the multiple actuators are driven with the use of the LAN, an ID (identification number) is assigned to each of the actuators beforehand. For example, as illustrated in FIG. 2, IDs from 0x00 to 0x03 are allocated to the actuators.

The air conditioner ECU 10 is based on a stepper motor system as a communication system. In the communication message of the stepper motor system, the number of steps of the stepper motor is used. The number of steps of the stepper motor is as high as 4000 to 6400 steps per revolution of the motor output shaft. Communication data on the position information is handled with 16 bits as the communication message.

Figure 3:
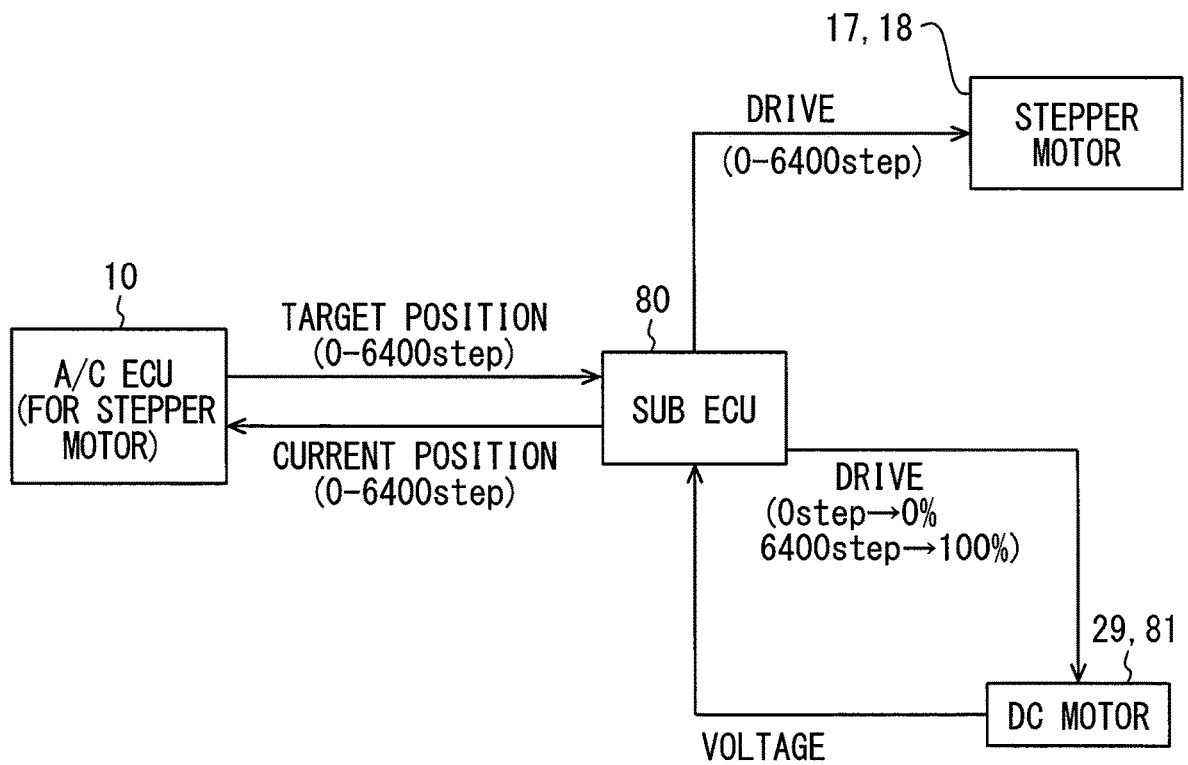
FIG. 3 is a diagram illustrating processing of a sub ECU according to the first embodiment.

The sub ECU 80 converts the communication message into the control information for controlling the DC motor when a target motor is the driver's seat side face door motor 29 or the rear seat side face door motor 81, on the basis of the ID of the transmission target of the communication message from the air conditioner ECU 10. As illustrated in FIG. 3, the sub ECU 80 drives the target actuator based on the converted control information.

Specifically, the communication message is transmitted from the air conditioner ECU 10 to the motor with the target ID so as to drive the motor to a target position (0 to 6400 steps). Then, when the motor with the target ID is a DC motor, the sub ECU 80 converts the target position from "step" to "%" for controlling the DC motor. A percentage corresponding to one step has been stored in the sub ECU 80 in advance. Assuming that 6400 steps are 360 degrees (one rotation), 90 degrees becomes 1600 steps. When the door is closed and opened at 0° to 90° and the operating angle is 90°, a drive range of the DC motor is set to 0% for 0° and 100% for 90°. Accordingly, upon receiving the communication message for setting 800 steps, the sub ECU 80 converts the target position into the control information located at 50% and drives the target DC motor.

In the case of the stepper motor system, because the position information of 16 bits is transmitted from the air conditioner ECU 10, the position information is converted into DC motor potentiometer position information of 8 bits inside the sub ECU 80 to control the position of the DC motor. As a result, an instruction of the number of driving steps for the stepper motor is transmitted, and the DC motor can be driven to a position corresponding to the number of steps transmitted.

More specifically, the air conditioner ECU 10 transmits a stop position command value to a door to which a certain address is assigned. When a 16-bit value indicating 1600 steps is transmitted to the sub ECU 80 as a command value of the stop position, the sub ECU 80 determines that the command value is a drive instruction to the stop position of 100%. The sub ECU 80 performs a position control so that the potentiometer voltage detection value coincides with the value of 8 bits corresponding to the 100% position. Further, when the sub ECU 80 receives an instruction to return the current position during driving, the sub ECU 80 returns a value corresponding to the number of steps of the stepper motor, thereby being capable of preventing abnormality detection or the like by the air conditioner ECU 10.

The sub ECU 80 drives the target actuator based on the communication message when a target motor is the driver's seat side stepper motor 17 and the passenger's seat side stepper motor 18, on the basis of the ID of the transmission target of the communication message from the air conditioner ECU 10.

Further, the actuator connected to the sub ECU 80 has no circuit unit for LAN connection. As will be described later, when the actuators are connected directly to the LAN hub, a communication circuit or the like is necessary. However, in the present embodiment, the sub ECU 80 is connected to the respective actuators, individually. Therefore, since the sub ECU 80 functions as a so-called drive circuit of the respective actuators, the sub ECU 80 can drive those actuators without the provision of a circuit unit in the respective actuators.

Figure 4:
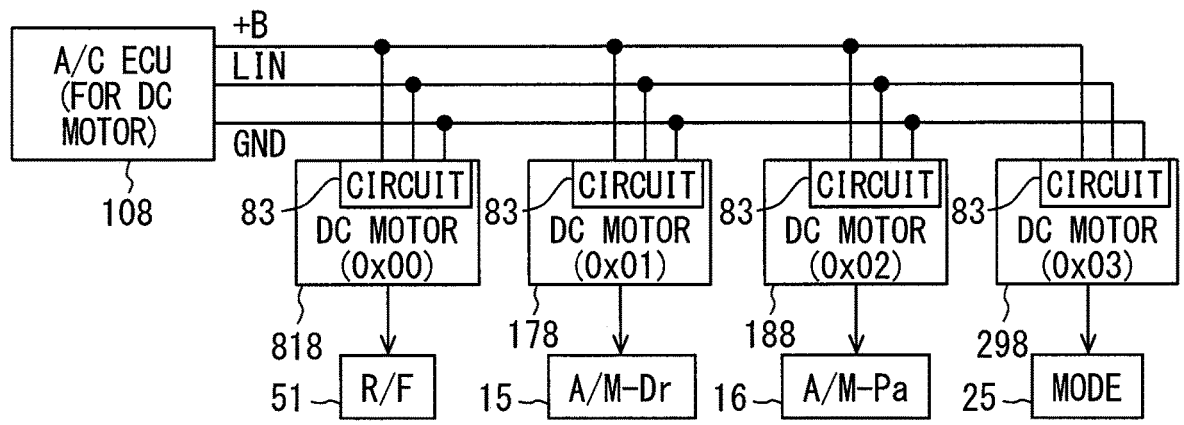
FIG. 4 is a block diagram illustrating an actuator control system according to Comparative Example 1.
Figure 5:
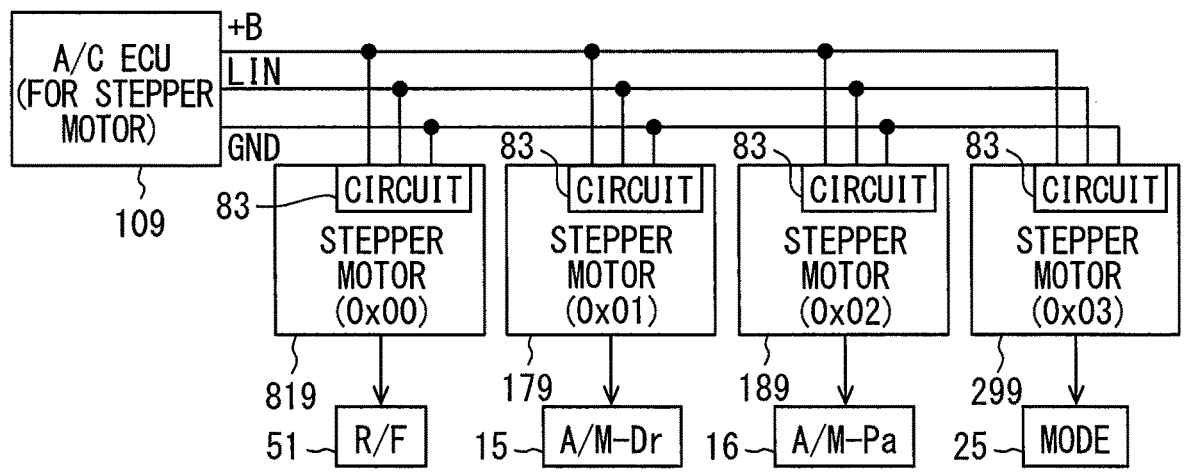
FIG. 5 is a block diagram illustrating an actuator control system according to Comparative Example 2.

FIGS. 4 and 5 illustrate an actuator control system according to comparative examples. In Comparative Example 1 illustrated in FIG. 4, an air conditioner ECU 108 is based on a DC motor system as a communication system. The air conditioner ECU 108 and the respective DC motors 178, 188, 298, 818 are connected to each other by the aid of a LAN bus. In addition, an LIN is used as a serial communication protocol for the in-vehicle LAN. Hereinafter, reference numerals of the DC motors in Comparative Example 1 will be omitted.

In Comparative Example 1 illustrated in FIG. 4 described above, a communication message for controlling the respective DC motors is transmitted from the air conditioner ECU 108. ID (identification number) is allocated to the respective DC motors in advance. For example, as illustrated in FIG. 4, IDs from 0x00 to 0x03 are allocated to the actuators. Each of the DC motors includes a circuit unit 83. Each of the DC motors forms a local device of the LAN system and includes a transmitting/receiving unit, a memory, and a motor drive circuit unit as the circuit unit 83 for communication using the LAN.

The LIN communication is a single master system of a master and a slave (a main device and a child device), and data cannot be transmitted from the slave unless instructed by the master, but there is no limitation on the reception operation, and the slave can receive data even when another slave transmits data. That is, a master response (token turn) and a slave response (token turn) are configured to exchange information on a periodic alternate schedule.

In Comparative Example 1, the air conditioner ECU 108 is set as the master, and the master includes an LIN driver circuit which is usually configured by one dedicated IC, and a microcomputer which is a control circuit. Also, each of the DC motors is set as the slave, and each local device includes at least the LIN driver circuit and a motor driver circuit. Thus, a bidirectional serial communication is performed between the master and the respective slaves.

Each of the DC motors receives only the communication message addressed to its own ID based on the LIN communication protocol, and is driven based on the received communication message. Therefore, the air conditioner ECU 108 can drive the respective DC motors connected to the LAN bus, individually.

However, since the air conditioner ECU 108 is based on the DC motor system, the air conditioning ECU 108 can generate only the communication message for controlling the DC motors. Therefore, even if the stepper motors are connected to the LAN bus, since the communication message differs between the DC motors and the stepper motors, the stepper motors cannot be driven.

In Comparative Example 2 illustrated in FIG. 5, an air conditioner ECU 109 is based on a stepper motor system as a communication system. The air conditioner ECU 109 and the respective stepper motors 179, 189, 299, and 819 are connected to each other by the aid of a LAN bus. In addition, an LIN is used as a serial communication protocol for the in-vehicle LAN as in Comparative Example 1. Hereinafter, reference numerals of the stepper motors in Comparative Example 2 will be omitted.

In Comparative Example 2 illustrated in FIG. 5 described above, a communication message for controlling the respective stepper motors is transmitted from the air conditioner ECU 109. ID (identification number) is allocated to the respective stepper motors in advance as in Comparative Example 1. Each of the stepper motors includes a circuit unit 83. Each of the stepper motors forms a local device of the LAN system and includes a transmitting/receiving unit, a memory, and a motor drive circuit unit as the circuit unit 83 for communication using the LAN.

In Comparative Example 2, the air conditioner ECU 109 is set as a master, and the respective stepper motors are set as slaves. A bidirectional serial communication is performed between the master and the respective slaves as described above.

Each of the stepper motors receives only the communication message addressed to its own ID based on the LIN communication protocol, and is driven based on the received communication message. Therefore, the air conditioner ECU 109 can drive the respective stepper motors connected to the LAN bus, individually.

However, since the air conditioner ECU 109 is based on the stepper motor system, the air conditioner ECU 109 can generate only the communication message for controlling the DC motors. Therefore, even if the DC motors are connected to the LAN bus, since the communication message differs between the stepper motors and the DC motors, the stepper motors cannot be driven.

As in the comparative examples, since the type of the actuators controlled by the air conditioner ECUs 108 and 109 is predetermined, it is impossible to control both of the DC motors and the stepper motors. Therefore, as described above, in the present embodiment, since the sub ECU relays the communication message, the actuator control system capable of controlling both of the DC motors and the stepper motors is realized.

In the stepper motor system, since the stepper motors each have no position sensor, initialization (initialization process) of the position is performed for a case where a step-out positional deviation occurs. In other words, each of the stepper motors is driven toward both ends of the door, and a door drive range is obtained according to the number of steps from a position where the stepper motor is locked to a position where the stepper motor is locked at the other end. A center value of the door drive range is set again as a value of 50%, and thereafter, each of the stepper motors is driven within a range of 0 to 100%.

Since the position of the DC motor with the potentiometer can be fed back as in the present embodiment, initialization is unnecessary for the DC motors. However, since the air conditioner ECU 10 is the stepper motor system, an initialization instruction is given to the DC motors. Therefore, the DC motors may dare to be driven to carry out the initialization process.

Also, since the DC motor is generally high in torque as compared with the stepper motor, in order to prevent the door lock attributable to the initialization from damaging members around the door, there is a need to increase the strength of those members. In order to prevent situations of damage and an improvement in the strength, the door is not actually locked at the end of the door, but is stopped at positions of 0% and 100% which are limit values of a door operation range, so that processing may be performed as if initialization is carried out.

In addition, the sub ECU 80 actually does not drive the DC motor but transmits only the control information to the air conditioner ECU 10, and may perform processing as if the initialization is implemented by the air conditioner ECU 10.

As described above, in the actuator control system according to the present embodiment, the air conditioner ECU 10 transmits a communication message in a single format to the multiple actuators. In the present embodiment, the air conditioner ECU 10 transmits the communication message in the format of controlling the stepper motor. Since the stepper motor and the DC motor (DC motor) are each controlled by a communication message in a predetermined format, the DC motor cannot be controlled with the communication message transmitted from the air conditioner ECU 10. However, in the present embodiment, the sub ECU 80 that relays the communication message transmitted from the air conditioner ECU 10 and drives the actuators is provided.

The sub ECU 80 converts the communication message transmitted from the air conditioner ECU 10 into the control information corresponding to the predetermined format of each actuator and drives each actuator. As a result, even if the DC motor is controlled in a format different from that of the communication message transmitted from the air conditioner ECU 10, the DC motor can be controlled by the sub ECU 80.

As a result, the multiple actuators can be controlled without changing the configuration of the air conditioner ECU 10 according to the actuators. In each of the actuators, the resolution of the response speed and the control position is different depending on the structure and the like, and when the structure is different, the format of the communication message may be different. Even with such actuators having different structures such as the stepper motor and the DC motor, the air conditioner ECU 10 can comprehensively control the multiple actuators by relaying the sub ECU 80. Therefore, the door suitable for the performance of each actuator is driven, thereby being capable of controlling the amount of air passing through the air flow passage of the vehicle air conditioning apparatus 100 so as to be more suitable for air conditioning in the vehicle interior.

Further, in the present embodiment, each of the DC motors has a function of detecting the rotational position. In order to initialize the rotational position of the stepper motor, the air conditioner ECU 10 transmits a communication message indicating an initialization process (initialization process). In the case where the actuator which is the transmission target of the communication message indicating the initialization process is the DC motor, the sub ECU 80 converts the communication message into the control information for controlling the DC motor, and drives the DC motor based on the converted control information. As a result, the air conditioner ECU 10 can cause the DC motor to execute the initialization process in a pseudo manner even with the stepper motor system. With the above configuration, error information can be prevented from being returned from the DC motor which originally does not require the initialization process.

Further, in the present embodiment, in the case where the actuator which is the transmission target of the communication message indicating the initialization process is the DC motor, the sub ECU 80 may convert the communication message into the control information for controlling the DC motor within a range where the door driven by the DC motor can be rotated. The sub ECU 80 drives the DC motor based on the converted control information. As a result, the door driven by the DC motor in the initialization process can be prevented from being driven beyond the operation range. Therefore, the door can be prevented from being damaged.

In addition, in the present embodiment, in the case where the actuator which is the transmission target of the communication message indicating the initialization process is the DC motor, the sub ECU 80 may not transmit the communication message to the DC motor under control. The sub ECU 80 may transmit the communication message indicating that the initialization process has been completed to the air conditioner ECU 10. As a result, the air conditioner ECU 10 can be prevented from being processed as an error by causing the DC motor not to execute the initialization process.

In addition, in the present embodiment, the sub ECU 80 is mounted in the vehicle air conditioning apparatus 100. As a result, even if the air conditioner ECU 10 is not mounted in the vehicle air conditioning apparatus 100, the sub ECU 80 mounted in the vehicle air conditioning apparatus 100 is connected to the air conditioner ECU 10, thereby being capable of controlling the multiple actuators.

As described above, in the conventional actuator control system, as the standardization of the air conditioner ECU 10 and the door actuators is advanced, there is a situation in which the function as the vehicle air conditioning apparatus 100 such as responsiveness has to be dropped. Therefore, as in the present embodiment, the sub ECU 80 receives the communication message of the air conditioner ECU 10 and drives the respective door actuators according to a command, thereby improving the characteristics of the vehicle air conditioning apparatus 100.

Specifically, since the driver's seat side stepper motor 17 and the passenger's seat side stepper motor 18 perform a fine control for a temperature control, an actuator having a high resolution stop accuracy is used. A high response (speed) is required for the mode switching door and the inside/outside air switching door 3 of the driver's seat side face door motor 29 and the rear seat side face door motor 81 for the purpose of performing odor interception and defogging, the DC motors are used. Even in the configuration in which the types of actuators are mixed together in this manner, different types of actuators can be controlled by the sub ECU 80 as described above.

Second Embodiment

Figure 6:
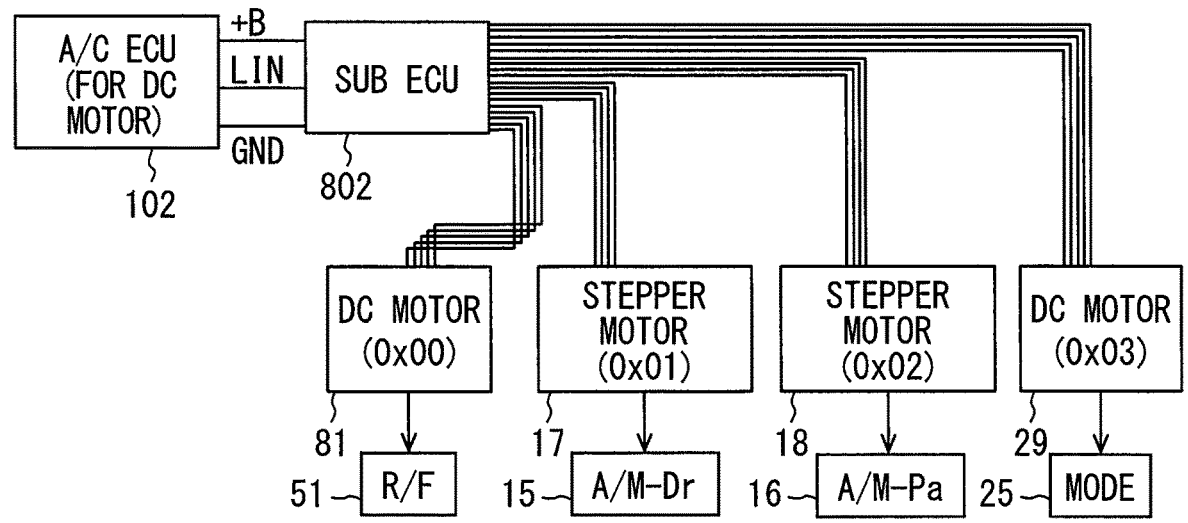
FIG. 6 is a block diagram illustrating an actuator control system according to a second embodiment of the present disclosure.
Figure 7:
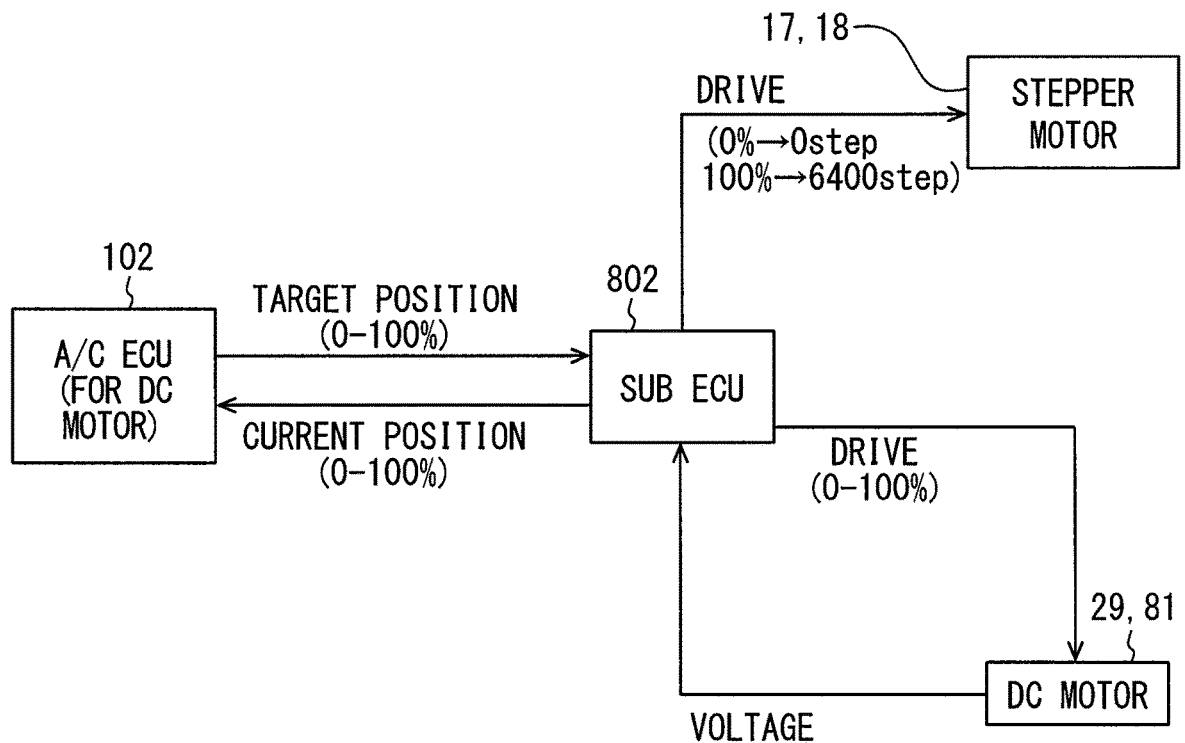
FIG. 7 is a diagram illustrating processing of a sub ECU according to the second embodiment.

Subsequently, a second embodiment of the present disclosure will be described with reference to FIGS. 6 and 7. The present embodiment is characterized in that, as illustrated in FIGS. 6 and 7, an air conditioner ECU 102 is a DC motor system. The air conditioner ECU 102 is based on the DC motor system as a communication system. In a communication message in the DC motor system, the opening degree (%) of DC motors is used. In the case of a position sensor using a potentiometer, the DC motor controls a stop position at the opening degree of 0 to 100%. As a specific example, communication data relating to the position information is 8 bit data, and analog voltage detection of 1 to 4 V is applied to 0 to 100% for control.

The sub ECU 802 converts the communication message into the control information for controlling the stepper motor when a target motor is the driver's seat side stepper motor 17 and the passenger's seat side stepper motor 18, on the basis of the ID of the transmission target of the communication message from the air conditioner ECU 102. As illustrated in FIG. 7, the sub ECU 802 drives the actuator based on the converted control information.

The air conditioner ECU 102 transmits an instruction of the stop position to the sub ECU 802 based on the position information from the potentiometer of the DC motor. The sub ECU 802 converts the target position from "%" to "step" for controlling the stepper motor. The conversion method is opposite to that of the first embodiment described above. As a result, the stepper motor can be controlled by the sub ECU 802 even with the air conditioner ECU 102 of the DC motor system.

In the DC motor system, there is no routine for executing the initialization process, but since the stepper motor is employed for the actuator, the stepper motor needs to be initialized. Therefore, the sub ECU 802 implements the initialization process on only the stepper motors under a predetermined condition. As a result, the position of the door can be controlled with high accuracy.

In addition, the sub ECU 802 implements the initialization process on the stepper motors at predetermined intervals as the predetermined condition. The predetermined interval is a timing at which the accuracy of the stepper motor may deteriorate, for example, when an ignition on time reaches 50 times, when the number of driving the servo reaches 100 times, or the like.

Further, the sub ECU 802 implements the initialization process when a predetermined period of time has elapsed since the driving source of the vehicle has stopped. The initialization process is implemented after the driving source of the vehicle has stopped, for example, after the ignition has turned off, thereby being capable of implementing the initialization process without being recognized by the occupant.

Third Embodiment

Figure 8:
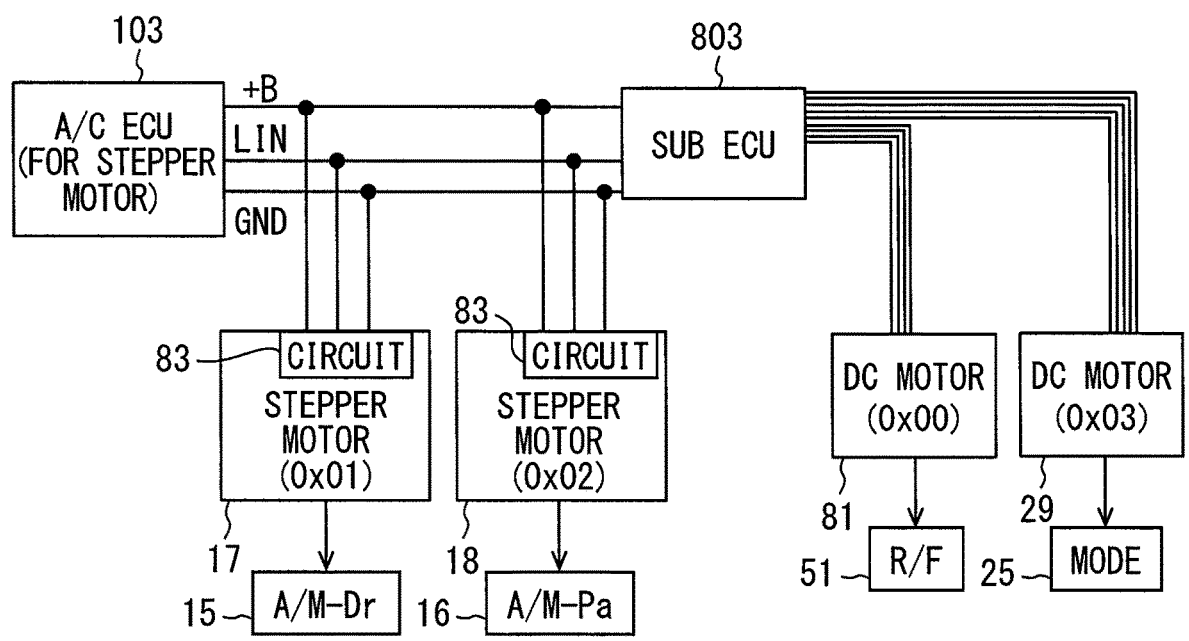
FIG. 8 is a block diagram illustrating an actuator control system according to a third embodiment of the present disclosure.

A third embodiment of the present disclosure will be described with reference to FIG. 8. The present embodiment is characterized in that, as illustrated in FIG. 8, an air conditioner ECU 103 is a stepper motor system, and the sub ECU 803 controls a part of actuators. As in the first embodiment described above, the air conditioner ECU 103 is based on a stepper motor system as a communication system.

A LAN bus of the air conditioner ECU 103 is connected with a driver's seat side stepper motor 17 or a passenger's seat side stepper motor 18. As in Comparative Example 2 described above, because the motor is connected to the LAN bus, the driver's seat side stepper motor 17 or the passenger's seat side stepper motor 18 is provided with a circuit unit 83.

The sub ECU 803 converts the communication message into the control information for controlling the DC motor when transmission targets of a communication message from the air conditioner ECU 103 are face door motors 29 and 81, as in the first embodiment. The sub ECU 803 drives the target actuator based on the converted control information.

The sub ECU 803 does not implement the control when a target motor is the driver's seat side stepper motor 17 or the passenger's seat side stepper motor 18, on the basis of the ID of the transmission target of the communication message from the air conditioner ECU 103. This is because the sub ECU 803 is not connected to the transmission target.

When the ID of the transmission target is each stepper motor, each stepper motor receives only the communication message addressed to its own ID based on the LIN communication protocol, and is driven based on the received communication message.

In this way, in the present embodiment, the actuator for which a format of the communication message needs to be converted is connected to the sub ECU 803. As a result, all of the actuators may not be connected to the sub ECU 803, and an actuator connectable to the LAN bus and controllable can be connected to the LAN bus. This makes it possible to control the actuators with different communication messages while simplifying the wiring.

Hereinbefore, the preferred embodiments of the present disclosure have been described. However, the present disclosure is not intended to be limited to the embodiments described above, and various modifications can be made without departing from the spirit of the invention.

The structures of the embodiment are merely illustrative, and the scope of the present disclosure is not limited to the range of the description of the structures.

In the first embodiment described above, the serial communication protocol using the LAN bus uses the LIN, but is not limited to the LIN. For example, the present disclosure can be also applied to, for example, CAN (registered trademark) or another communication method based on the serial communication protocol.

In the first embodiment described above, the position sensor of the DC motor is configured by the potentiometer, but is not limited to the potentiometer. The position detection device may be a DC motor having another position sensor, such as a pulse detection method such as an encoder, or a pulse count method by surge voltage detection.

In the first embodiment described above, although the host main control unit of the sub ECU 80 is the air conditioner ECU 10, but is not limited to the air conditioner ECU 10. For example, another control device such as an engine ECU may be a host control device.

In the first embodiment described above, the actuators include the stepper motors and the DC motors, but the present disclosure is not limited to those two types. Other actuators may be used, and the DC motor may be a DC motor having no function of detecting the rotational position. Also, the formats of the communication messages of the respective DC motors need not be identical with each other, and even the DC motor different in performance such as resolution may be configured by an actuator that can be driven by allowing the sub ECU to convert the communication message into control information. The same is applied to the stepper motor.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An actuator control system for a vehicle air conditioning apparatus that blows conditioned air into a vehicle interior, the actuator control system comprising:
a plurality of doors that adjusts an amount of air passing through an air flow passage which is for blowing the air into the vehicle interior;
a plurality of actuators that drives the respective doors;
a main control unit that transmits a communication message for controlling driving of the respective actuators; and
a sub-control unit that relays the communication message transmitted by the main control unit and drives the respective actuators, wherein
the plurality of actuators includes both a stepper motor and a DC motor,
the DC motor has a function of detecting a rotational position,
the main control unit transmits the communication message in step format for controlling the stepper motor to the plurality of actuators, and transmits the communication message in step format indicating an initialization process to initialize the rotational position of the stepper motor,
the sub-control unit converts the communication message transmitted by the main control unit into control information corresponding to a predetermined format of each of the actuators, and drives each of the actuators,
when the actuator is the DC motor as a target of transmission of the communication message, the sub-control unit converts the communication message in step format into control information in percent (%) format for controlling the DC motor while a range of a number of steps of the stepper motor is defined to correspond to a driving range of the DC motor from 0% to 100%, and drives the DC motor based on the converted control information, and
when the actuator is the DC motor as a target of transmission of the communication message indicating the initialization process, the sub-control unit converts the communication message in step format into control information in percent (%) format for controlling the DC motor, and drives the DC motor based on the converted control information.

2. The actuator control system according to claim 1, wherein
when the actuator is the DC motor as the target of transmission of the communication message indicating the initialization process, the sub-control unit converts the communication message into control information for controlling the DC motor within a rotatable range of the doors driven by the DC motor, and drives the DC motor based on the converted control information.

3. The actuator control system according to claim 1, wherein
when the actuator is the DC motor as the target of transmission of the communication message indicating the initialization process, the sub-control unit transmits the communication message indicating a completion to the main control unit, assuming that implementation of the initialization process has been completed without implementing the initialization process of the DC motor.

4. The actuator control system according to claim 1, wherein the sub-control unit is mounted in the vehicle air conditioning apparatus.

5. The actuator control system according to claim 1, wherein the sub-control unit is connected to the plurality of actuators without a bus.

6. An actuator control system for a vehicle air conditioning apparatus that blows conditioned air into a vehicle interior, the actuator control system comprising:
a plurality of doors that adjusts an amount of air passing through an air flow passage which is for blowing the air into the vehicle interior;

a plurality of actuators that drives the respective doors;

a main control unit that transmits a communication message for controlling driving of the respective actuators; and a sub-control unit that relays the communication message transmitted by the main control unit and drives the respective actuators, wherein the plurality of actuators includes both a stepper motor and a DC motor, the main control unit transmits the communication message in percent (%) format for controlling the DC motor to the plurality of actuators, the sub-control unit converts the communication message transmitted by the main control unit into control information corresponding to a predetermined format of each of the actuators, and drives each of the actuators, and when the actuator is the stepper motor as a target of transmission of the communication message, the sub-control unit converts the communication message in percent (%) format into control information in step format for controlling the stepper motor while a driving range of the DC motor from 0% to 100% is defined to correspond to a range of a number of steps of the stepper motor, and drives the stepper motor based on the converted control information.

7. The actuator control system according to claim 6, wherein the sub-control unit implements an initialization process for initializing a position of the stepper motor.

8. The actuator control system according to claim 7, wherein the sub-control unit implements the initialization process of the stepper motor at predetermined intervals.

9. The actuator control system according to claim 7, wherein the sub-control unit implements the initialization process of the stepper motor when a predetermined period of time has elapsed since a driving source of the vehicle stops.

10. The actuator control system according to claim 6, wherein the sub-control unit is connected to the plurality of actuators without a bus.

* * * * *